(12) United States Patent
Ishikawa et al.

(10) Patent No.: US 6,362,795 B2
(45) Date of Patent: Mar. 26, 2002

(54) ANTENNA APPARATUS AND TRANSMISSION AND RECEIVING APPARATUS USING THE SAME

(75) Inventors: Yohei Ishikawa; Toru Tanizaki, both of Kyoto; Fuminori Nakamura, Nagaokakyo; Ikuo Takakuwa, Suita, all of (JP)

(73) Assignee: Murata Manufacturing Co., Ltd. (JP)

(*) Notice: Subject to any disclaimer, the term of this patent is extended or adjusted under 35 U.S.C. 154(b) by 0 days.

(21) Appl. No.: 09/003,662

(22) Filed: Jan. 7, 1998

(30) Foreign Application Priority Data

Jan. 7, 1997 (JP) .............................................. 9-000893

(51) Int. Cl.$^7$ .............................................. H01Q 19/06
(52) U.S. Cl. ...................................... 343/753; 343/754
(58) Field of Search ................................ 343/711, 713, 343/753, 754, 786, 700 MS, 839, 909, 911 L, 911 R, 757, 758

(56) References Cited

U.S. PATENT DOCUMENTS

| | | | |
|---|---|---|---|
| 2,887,684 A | * 5/1959 | Dexter et al. ................ | 343/753 |
| 3,761,935 A | * 9/1973 | Silbiger et al. .............. | 343/754 |
| 3,833,909 A | * 9/1974 | Schaufelberger ............ | 343/754 |
| 4,531,129 A | * 7/1985 | Bonebright et al. ......... | 343/754 |
| 4,566,321 A | * 1/1986 | Zacchio ....................... | 343/753 |
| 4,642,651 A | * 2/1987 | Kuhn .......................... | 343/754 |
| 4,794,398 A | * 12/1988 | Raber et al. ................. | 343/754 |

FOREIGN PATENT DOCUMENTS

| | | |
|---|---|---|
| DE | 4412770 | 10/1995 |
| DE | 19530065 | 1/1997 |
| DE | 19642810 | 4/1998 |
| EP | 0498524 | 8/1992 |
| EP | 0676648 | 10/1995 |
| EP | 0743697 | 5/1996 |
| GB | 2205996 | 5/1988 |
| JP | 252505 | 8/1950 |
| JP | 10170647 | 6/1998 |

OTHER PUBLICATIONS

Henry Jasik, Antenna Engineering Handbook, first edition, 1961, McGraw–Hill, chapter 15, "Scanning Antennas" p. 15–2.

* cited by examiner

*Primary Examiner*—Tan Ho
(74) *Attorney, Agent, or Firm*—Ostrolenk, Faber, Gerb & Soffen, L.L.P.

(57) ABSTRACT

An antenna apparatus such that a dielectric strip and a dielectric resonator are provided to form a primary vertical radiator, another dielectric strip is provided which is coupled to the dielectric strip to form a directional coupler, and a radiation beam is tilted by changing the relative position of the primary radiator with respect to the dielectric lens by displacing the primary vertical radiator in the directional coupler.

5 Claims, 16 Drawing Sheets

OFFSET OF PRIMARY RADIATOR/mm

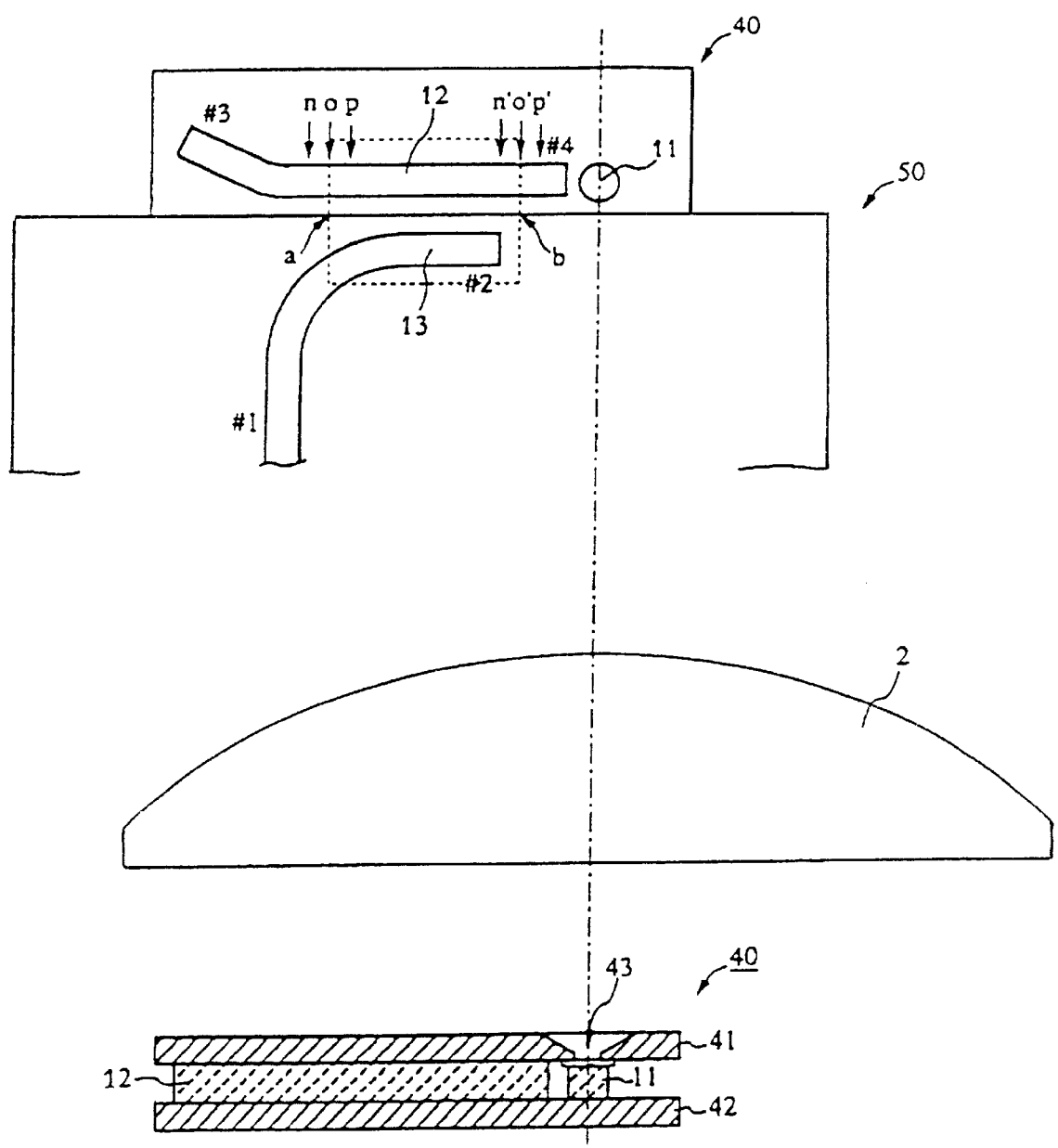

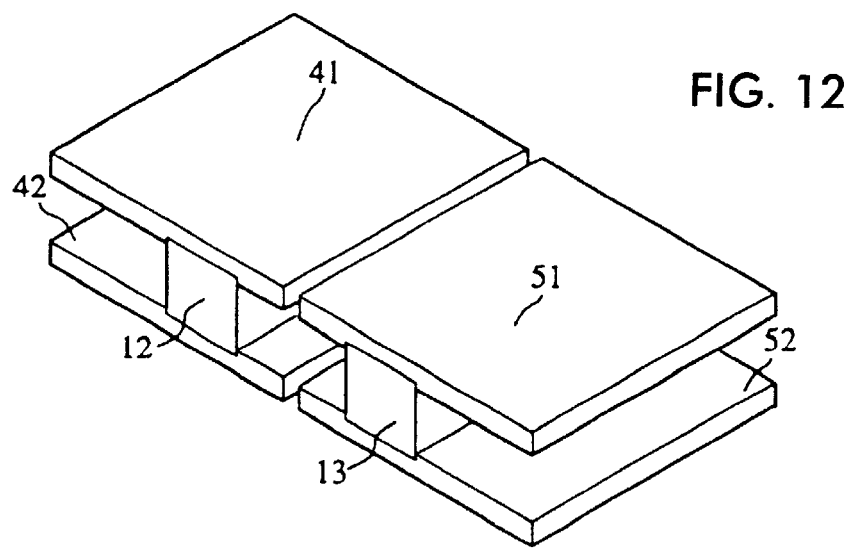
FIG. 12
FIG. 13A
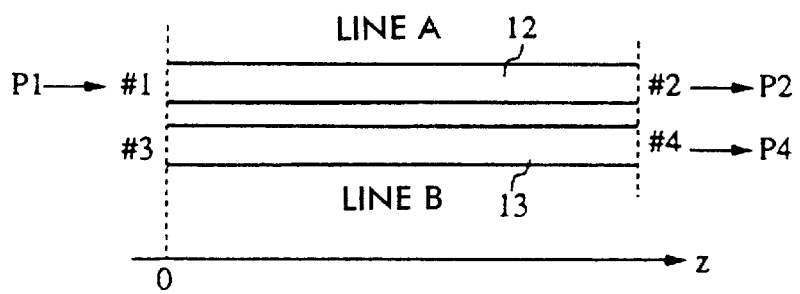
FIG. 13B
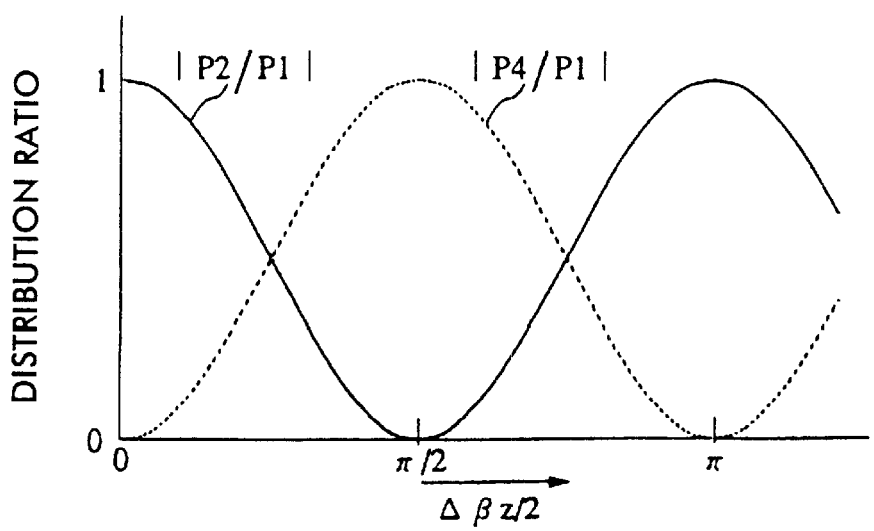

ANTENNA APPARATUS AND TRANSMISSION AND RECEIVING APPARATUS USING THE SAME

BACKGROUND OF THE INVENTION

1. Field of the Invention

The present invention relates to an antenna apparatus. More particularly, the present invention relates to an antenna apparatus which is used in a radar or the like for transmitting and receiving an electromagnetic wave of a millimetric-wave band and a transmission and receiving apparatus using the same.

2. Description of the Related Art

Millimetric-wave radars to be mounted in motor vehicles are used in a system for supporting safe driving of automobiles. The millimetric-wave radar is used to measure the distance between two automobiles or between an obstacle in the path of an automobile and the automobile. Based on the measurement data, the speed control and braking of the automobile are performed so that collision into another automobile or an obstacle is prevented.

Generally, a transmission and receiving module using a millimetric-wave radar incorporates a millimetric-wave oscillator, a circulator, a directional coupler, a mixer, an antenna, and so on.

The vehicle on the right side in FIG. 21 (behind) radiates a millimetric wave from a radar by an FM-CW (Frequency Modulation-Continuous Wave) method to the automobile on the left side (ahead) and receives a millimetric wave reflected by the automobile on the left side. The distance between the right and left automobiles and the relative speed between the right and left automobiles are computed by a known computation method.

The computation is performed by a signal processing section of the signal processing apparatus of FIG. 22. The result of the computation is transmitted to a control and warning section. The control and warning section causes a warning device to operate when, for example, the driving velocity of the automobile on the right is equal to or higher than a predetermined value and the distance between the right and left automobiles is equal to or lower than a predetermined value. Alternatively, the control section may operate a braking apparatus of the right or trailing automobile under given conditions.

Since the directivity of the antenna used in the conventional millimetric-wave radar is fixed, problems such as those described below occur.

As shown in FIG. 18, when separate automobiles are driving on two parallel traffic lanes, a millimetric wave transmitted from a radar of an automobile Cm may reach an automobile Ca and an automobile Cb in front. This is because adjustments cannot be made such that the directivity of the antenna is varied so that the millimetric wave is radiated only to the automobile within the traffic lane in which the automobile Cm is driving.

The millimetric wave which reaches the respective automobiles is reflected and received by the automobile Cm. Since the automobiles Cb and Cm are driving in separate traffic lanes, even if the automobiles Cb and Cm come too close to each other, the automobile Cm does not need to perform special safety control.

However, in the automobile Cm, it is not possible to identify from which automobile Ca or Cb the received wave has been reflected. Therefore, when the vehicle-to-vehicle distance between the automobiles Cb and Cm is smaller than an allowable distance, control for safety is performed by the automobile Cm. Further, when the directivity of the antenna is fixed, inconveniences such as those described below occur.

An automobile Cm driving near the entrance of a curve in FIG. 19 radiates a millimetric wave B1; however, the millimetric wave does not reach the automobile Ca driving near the exit of the curve.

Also in the case where a road has inclines and declines, as shown in FIG. 20, in the automobile Cm driving before a slope while radiating the millimetric wave B1, the automobile Ca moving on the slope is not detected.

Therefore, the following method may be used in which the direction of a radiation beam is changed to solve the above-described problems.

For example, in FIG. 18, radiation beams B1, B2, and B3 are radiated respectively so as to make measurements for each direction. By comparing these results, it is possible to detect the automobiles Ca and Cb individually.

In the example shown in FIG. 19, the presence of a curve in front of the automobile Cm is recognized based on the steering-wheel operation, and the millimetric wave B1 is switched to the millimetric wave B2. There is also a method for detecting a curve by analyzing the image input from a camera. Also in the example shown in FIG. 20, a slope is detected by analyzing the image input from the camera, and the millimetric wave B1 is switched to the millimetric wave B2.

In the conventional radar system, the direction of radiation of a radiation beam of an electromagnetic wave is changed by rotating the housing of the transmission and receiving apparatus which incorporates an antenna by a motor or the like. Since the housing includes parts other than the antenna, it is difficult to reduce the size of the mechanism for rotating the housing. Therefore, it is difficult to rotate the housing at a high speed and to scan the radiation beam at a high speed.

SUMMARY OF THE INVENTION

An object of the present invention is provide an antenna apparatus and a transmission and receiving apparatus using the same having a small size and being capable of switching the directivity of the antenna at a high speed.

An antenna apparatus according to a first aspect of the present invention comprises a primary radiation element for radiating a radar wave and a dielectric lens for focusing a radar wave, wherein the primary radiation element is movable within the focal plane of the lens.

The change of the position with respect to the lens of the primary radiation element causes the directivity of a radar beam radiated from the primary antenna apparatus to vary. Since the primary radiation element is relatively light-weight, an element driving apparatus may be of a small scale. Further, since the inertia of the primary radiation element is small, it is possible to move the primary radiation element at a high speed, making high-speed scanning of the radar beam possible.

In an antenna apparatus according to another aspect of the present invention, the direction of the center axis of the dielectric lens with respect to the radiation plane of the primary radiation element is variable.

In an antenna apparatus according to still another aspect of the present invention, in order to displace the position of the primary radiator within the focal plane of the dielectric lens, the primary radiator comprises a first dielectric line serving as an input/output section, a dielectric resonator which is coupled to the first dielectric line, and an opening section from which an electromagnetic wave is radiated or is made to enter in the axial direction, a second dielectric line is provided close to the first dielectric line in order to form a directional coupler, and the relative positional relationship between the dielectric lens and the primary radiator is changed in the coupled section of the first and second dielectric lines. Since a movable section which inputs and outputs signals to and from the primary radiator as described above is formed of a directional coupler formed of a dielectric line on the primary radiator side and another dielectric line, it becomes possible to change the relative position between the primary radiator and the dielectric lens while maintaining the coupling relationship.

In the directional coupler, if the amount of coupling is made approximately 0 dB, transmission loss in the directional coupler is suppressed by as much as possible, and the efficiency of the antenna is not reduced.

Further, in the antenna apparatus of the present invention, a transmission section, a receiving section, and a circulator for separating a transmission signal and a received signal are connected to the second dielectric line so that the antenna apparatus is used for both transmission and reception. As a result, the primary radiator formed of the first dielectric line and the dielectric resonator coupled to the first dielectric line, and a second dielectric line coupled to the first dielectric line can be used for both transmission and reception, thereby preventing a larger size because the movable section is formed by using the directional coupler.

Furthermore, in the present invention, a driving section for changing the relative positional relationship between the dielectric lens and the primary radiator may be provided so that a transmission and receiving apparatus is formed. As a result, a small transmission and receiving apparatus capable of scanning in the orientational direction of the antenna can be obtained.

The above and further objects, aspects and novel features of the invention will become more apparent from the following detailed description when read in connection with the accompanying drawings.

BRIEF DESCRIPTION OF THE DRAWINGS

FIG. 11 shows the relationship between the primary vertical radiator and a dielectric-line apparatus;

FIG. 12 is a partial perspective view of a directional coupler;

FIGS. 13A and 13B show the construction of the directional coupler and the relationship to the characteristics thereof;

DETAILED DESCRIPTION OF EMBODIMENTS OF THE INVENTION

The construction of an antenna apparatus and a transmission and receiving apparatus according to a first embodiment of the present invention will be described below with reference to FIGS. 1A, 1B, 1C, 1D, 1E, and 1F to 7.

Figure 1A:
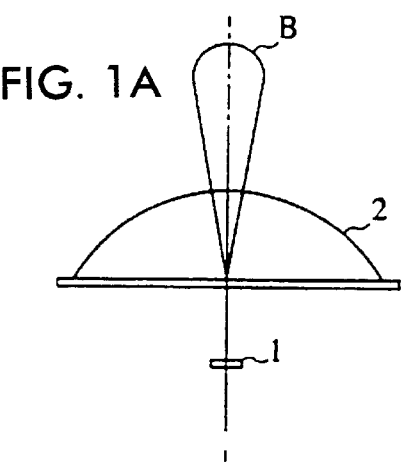
FIGS. 1A, 1B, 1C, 1D, 1E, and 1F show the relationship between a dielectric lens and a primary radiator of an antenna apparatus, and the relationship to the tilt angle of a radiation beam according to a first embodiment of the present invention.
Figure 1D:
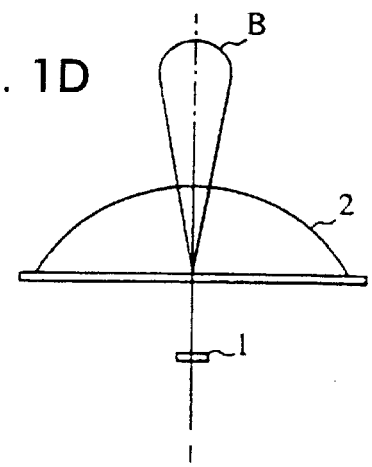
Figure 1B:
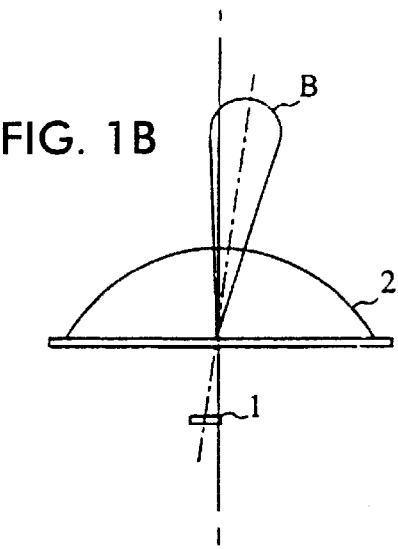
Figure 1E:
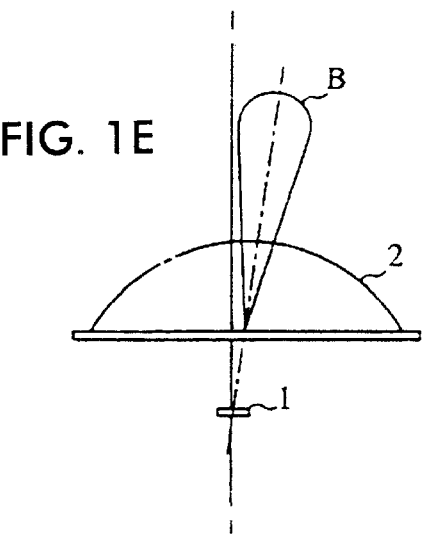
Figure 1C:
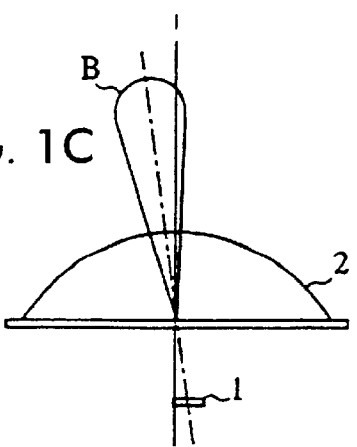
Figure 1F:
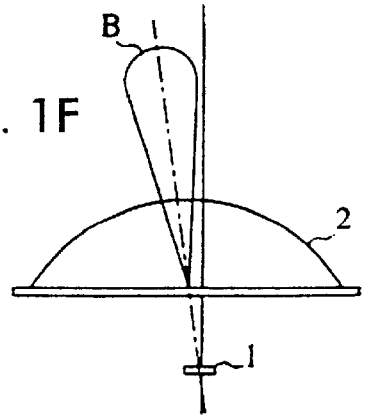

FIGS. 1A to 1F show the positional relationship between a dielectric lens and a primary radiator, and the relationship with the directivity of a radiation beam. In FIGS. 1A to 1F, reference numeral 1 denotes a primary radiator, with a dielectric lens 2 being disposed with its radiation direction as the center axis. FIGS. 1A, 1B, and 1C show an example in which the dielectric lens 2 is fixed and the primary radiator 1 is movable. As shown in FIG. 1A, when the center axis of the dielectric lens 2 coincides with the radiation direction of the primary radiator 1, a radiation beam B is directed toward the front of the dielectric lens 2. However, when the primary radiator 1 is displaced within the focal plane of the dielectric lens 2 as shown in FIGS. 1B and 1C, the radiation beam B is directed in a direction opposite to the displacement direction. FIGS. 1D, 1E, and 1F show an example in which the primary radiator 1 is fixed and the dielectric lens 2 is movable. When the center axis of the dielectric lens 2 coincides with the radiation direction of the primary radiator 1, a radiation beam B is directed toward the front of the dielectric lens 2. However, when the dielectric lens 2 is displaced in a direction perpendicular to the center axis thereof as shown in FIGS. 1E and 1F, the radiation beam B is directed toward the displacement direction.

Figure 2A:
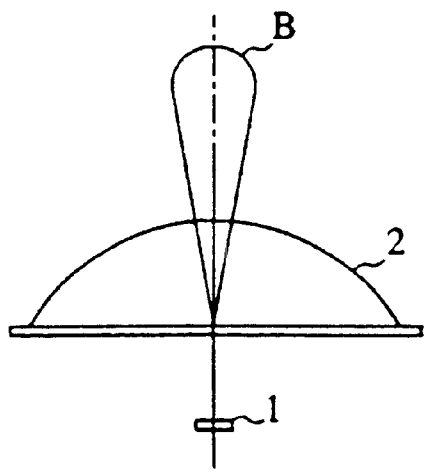
FIGS. 2A, 2B, and 2C show another relationship between a dielectric lens and a primary radiator of an antenna apparatus, and another relationship to the tilt angle of a radiation beam according to the first embodiment of the present invention.
Figure 2B:
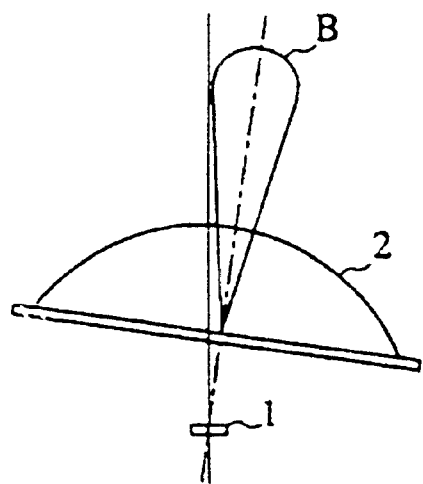
Figure 2C:
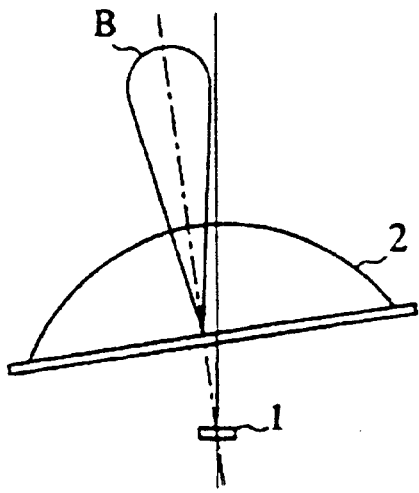

FIGS. 2A, 2B and 2C show a case in which the angle between the dielectric lens and the primary radiator is varied to vary the direction of the radiation beam. As shown in FIG. 2A, when the radiation direction of the primary radiator 1 is directed in the direction of the center axis of the dielectric lens 2, the radiation beam B is directed toward the front of the dielectric lens 2. However, by varying the axial direction of the dielectric lens with respect to the primary radiator 1 as shown in FIGS. 2B and 2C, the radiation beam B is directed in that direction.

Figure 3A:
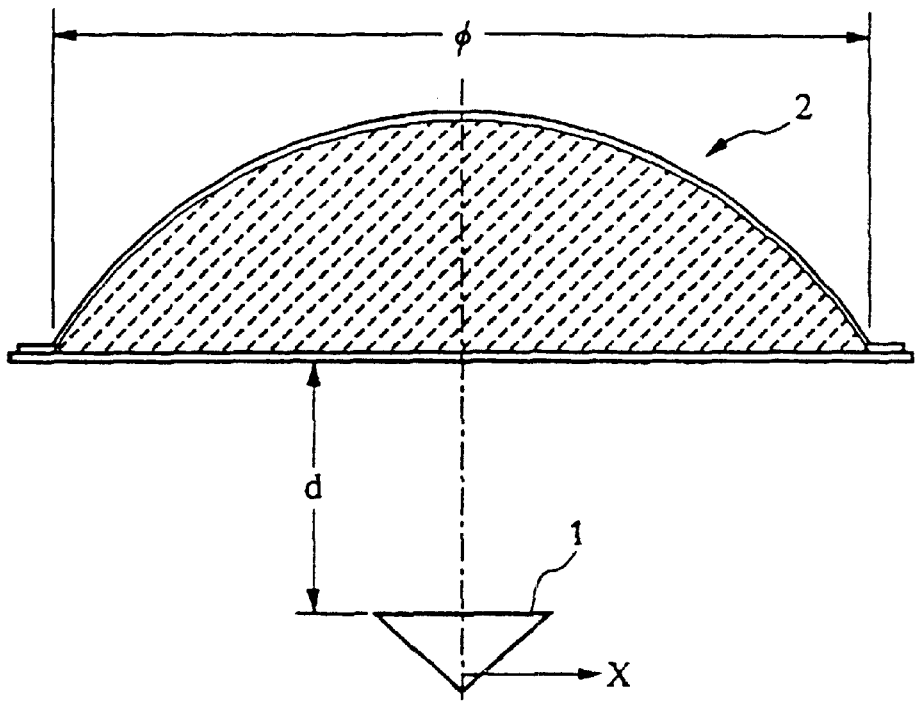
FIGS. 3A and 3B show the measurement result of the tilt angle of the radiation beam with respect to the offset of the primary radiator from the dielectric lens.
Figure 3B:
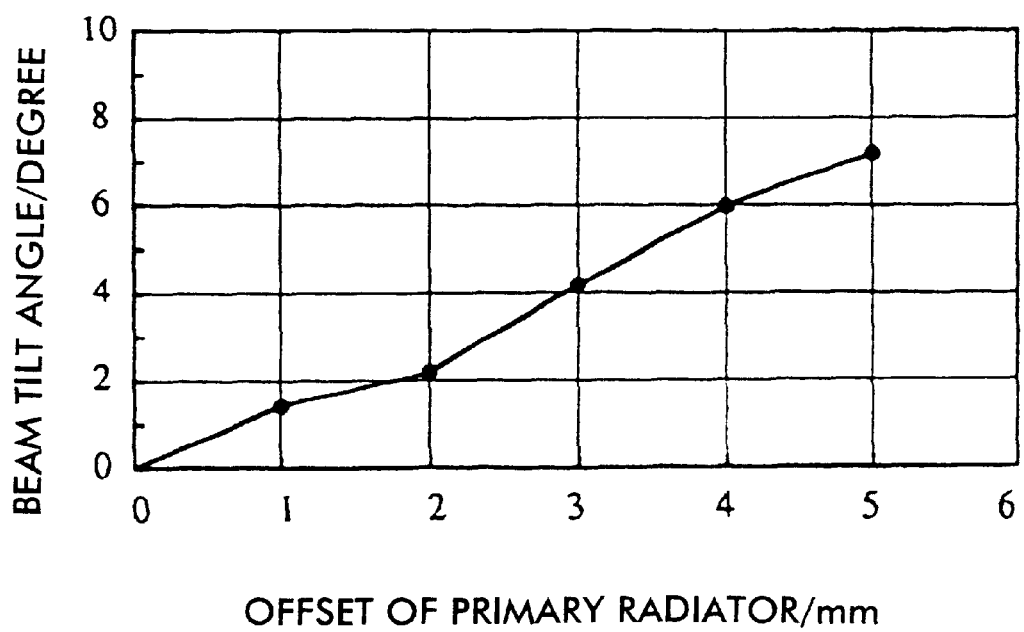

FIGS. 3A and 3B show the measurement result of the directional angle (tilt angle) of the radiation beam when the amount of displacement (offset) within the focal plane of the primary radiator 1 with respect to the dielectric lens 2 is varied. Here, as the dielectric lens 2, PE (polyethylene) of a relative dielectric constant r=2.3 is used, the open aperture N thereof is set at 75 mm, the focal distance d thereof is set at 22.5 mm, and as the primary radiator 1, a horn antenna is used. By varying the amount of offset of the primary radiator 1 in a range of 0 to 5 mm as described above, the tilt angle of the radiation beam can be varied in a range of 0 to 7 degrees as shown in FIG. 3B.

Figure 4A:
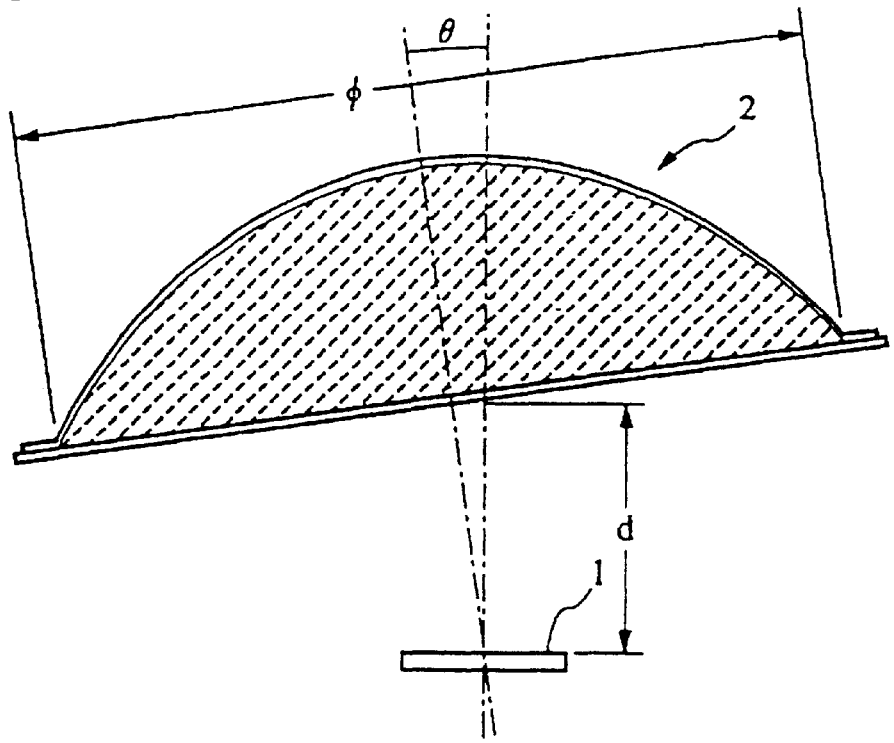
FIGS. 4A and 4B show the measurement result of the tilt angle of the radiation beam when the angle of the dielectric lens with respect to the primary radiator is varied.
Figure 4B:
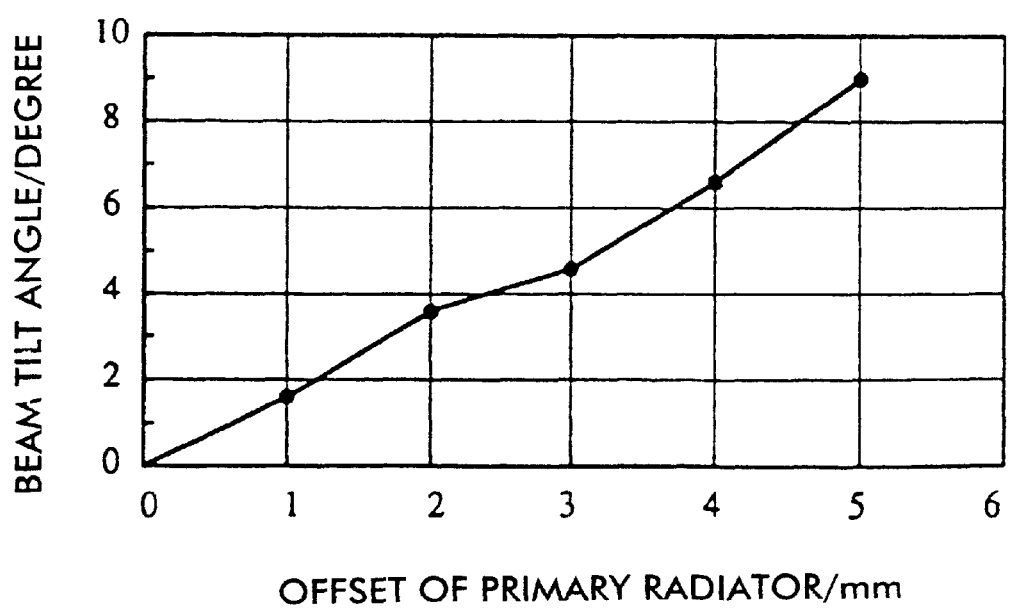

FIGS. 4A and 4B show the measurement result of the directional angle (tilt angle) of the radiation beam when the axial direction of the dielectric lens 2 with respect to the primary radiator is varied. Here, as the dielectric lens 2, PE of a relative dielectric constant r=2.3 is used, the open aperture N thereof is set at 75 mm, the focal distance d thereof is set at 21.0 mm, and as the primary radiator 1, a primary vertical radiator formed of a dielectric resonator which is excited by a non-radiative dielectric line (NRD guide) is used. By varying the angle of the dielectric lens 2 in a range of 0 to 5 degrees as described above, the tilt angle of the radiation beam can be varied in a range of 0 to 9 degrees as shown in FIG. 4B.

Figure 5:
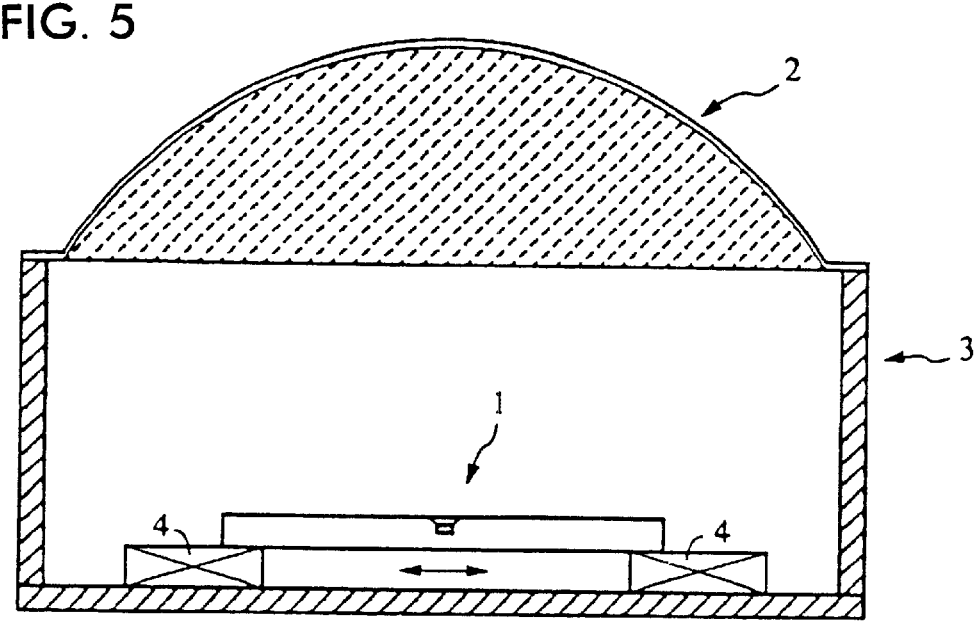
FIG. 5 is a sectional view illustrating an example of the construction of a transmission and receiving apparatus according to the first embodiment of the present invention.

FIG. 5 is a sectional view illustrating the construction of a transmission and receiving apparatus. In FIG. 5, reference numeral 3 denotes a housing which houses a transmitting and receiving section, including the primary radiator 1, with the dielectric lens 2 being mounted to the opening section (the upper part in FIG. 5). Within the housing 3, the primary radiator 1 is mounted via a driving section 4, which causes the primary radiator 1 to be displaced in a planar direction perpendicular to the radiation direction. This driving section 4 is formed of, for example, a linear motor or a solenoid. With this construction, as shown in FIGS. 1A to 1C, the relative positional relationship between the dielectric lens 2 and the primary radiator 1 is varied to tilt the radiation beam.

Figure 6:
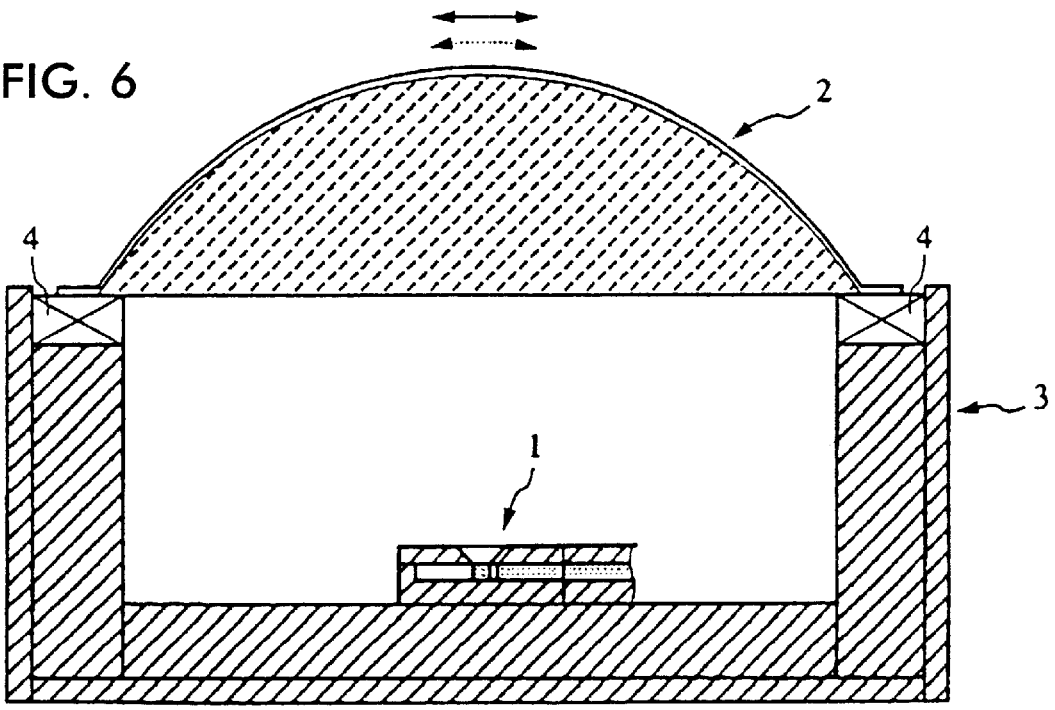
FIG. 6 is a sectional view illustrating another example of the construction of the transmission and receiving apparatus according to the first embodiment of the present invention.

FIG. 6 is a sectional view illustrating another example of the construction of the transmission and receiving apparatus. In FIG. 6, within the housing 3, the whole of the transmitting and receiving section, including the primary radiator 1, is fixed, with the dielectric lens 2 being mounted onto the opening section of the housing 3 via the driving section 4. This driving section 4, which is formed of a linear motor, a solenoid, and the like, causes the dielectric lens 2 to be displaced in a planar direction normal to the center axis thereof. As a result, as shown in FIGS. 1D to 1F, the dielectric lens is displaced with respect to the primary radiator in order to tilt the radiation beam.

Figure 7:
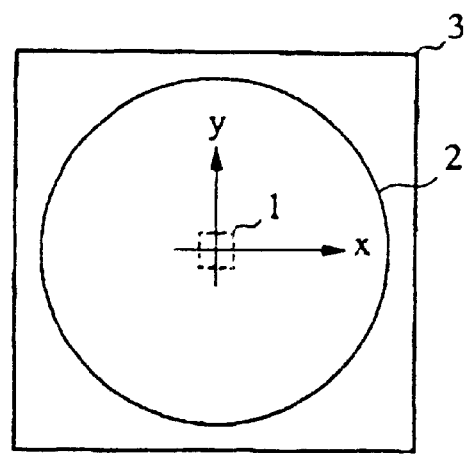
FIG. 7 is a plan view of the transmission and receiving apparatus according to the first embodiment of the present invention.
Figure 18:
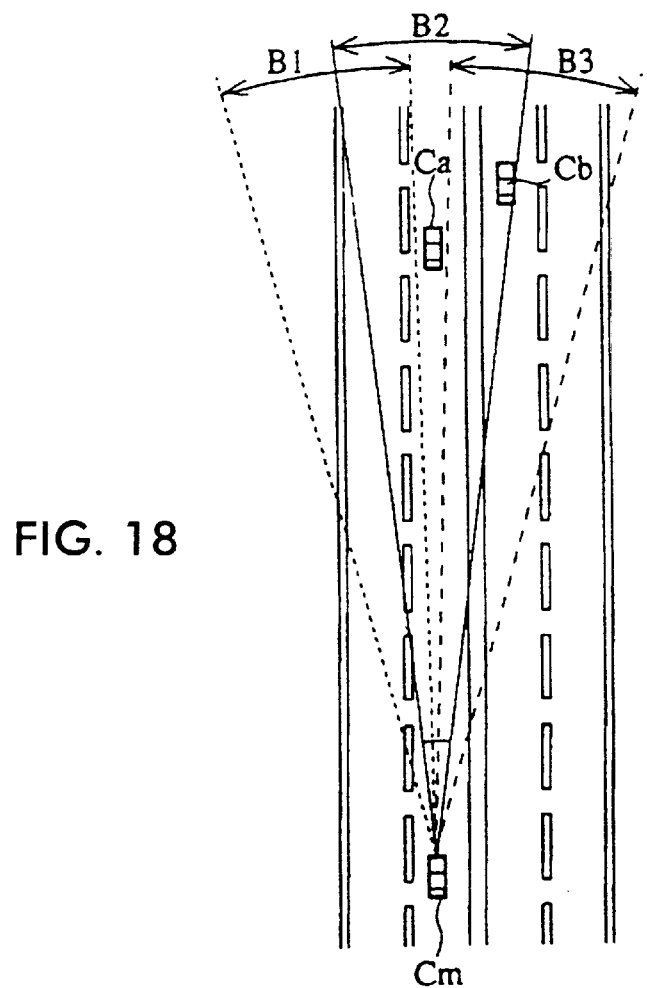
FIG. 18 shows the situation in which the radiation beam is tilted in the horizontal direction in a vehicle-mounted radar.
Figure 19:
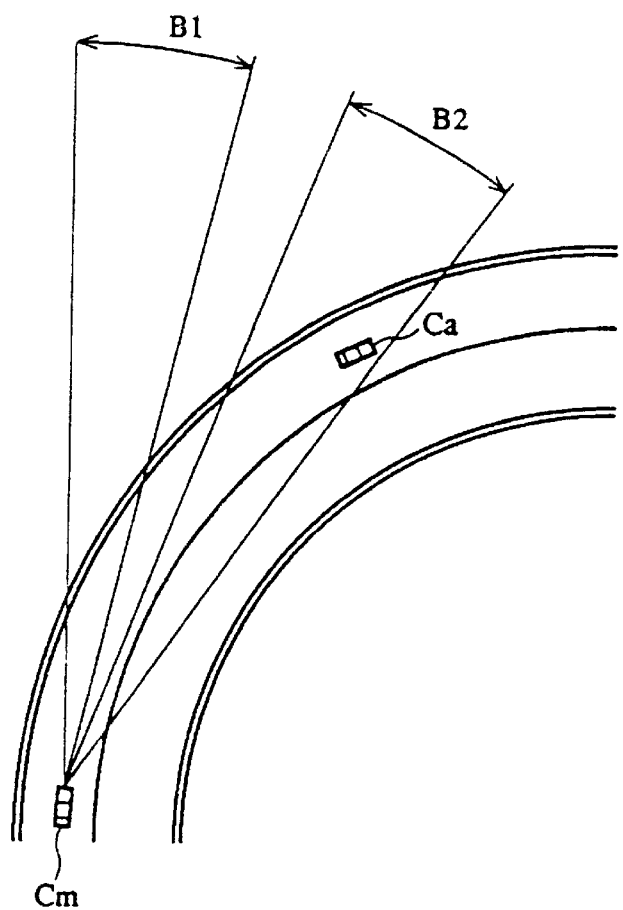
FIG. 19 shows the situation in which the radiation beam is tilted in the horizontal direction in the vehicle-mounted radar due to a curve in the road.
Figure 20:
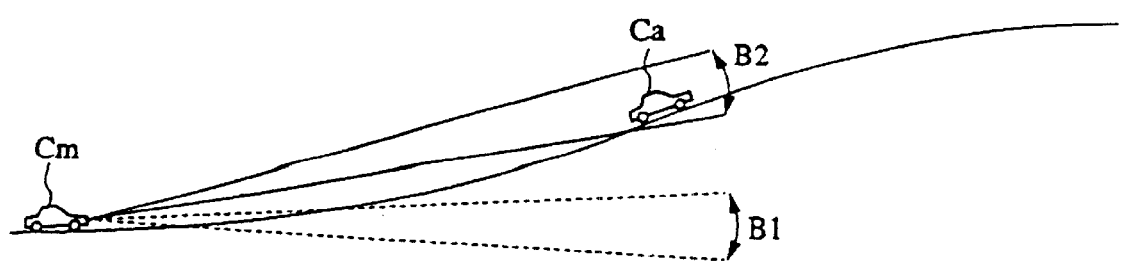
FIG. 20 shows the situation in which the radiation beam is tilted in the vertical direction in the vehicle-mounted radar.
Figure 21:
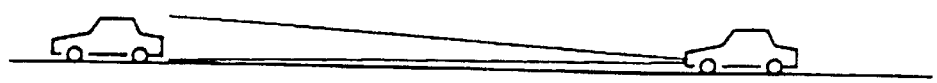
FIG. 21 shows the way the vehicle-mounted radar is used.
Figure 22:
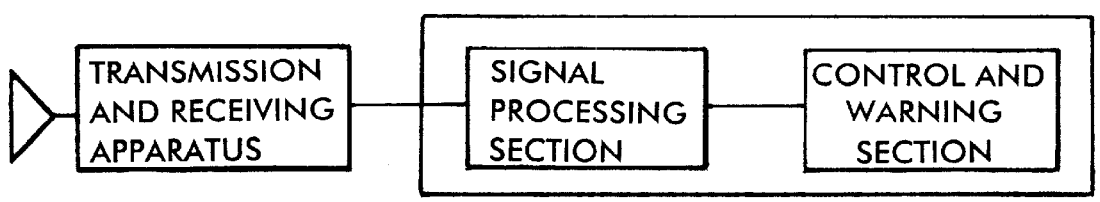
FIG. 22 is a block diagram of the vehicle-mounted radar.

Also in the case where the angle of the dielectric lens with respect to the primary radiator is varied as shown in FIG. 2, basically, the construction shown in FIG. 6 may be adopted. That is, in FIG. 6, each of two of the right and left driving sections 4 may be displaced to vary the axial direction of the dielectric lens. Further, when the angle of the primary radiator with respect to the dielectric lens is varied, basically, the construction shown in FIG. 5 may be adopted. That is, in FIG. 5, each of two of the right and left driving sections 4 may be displaced to vary the axial direction of the primary radiator. In the above-described examples, for the sake of description, the primary radiator or the dielectric lens is displaced in directions within the plane of the paper surface, and as shown in FIGS. 18 to 20, the primary radiator or the dielectric lens may be displaced in the two-dimensional direction when the radiation beam is tilted not only in the right-to-left direction but also in the up-and-down direction as in a millimetric-wave radar which detects a vehicle in the forward direction. FIG. 7 is a plan view of the transmission and receiving apparatus when viewed from the axial direction of the dielectric lens. In this case, by displacing the primary radiator 1 relatively in the x-axis and y-axis directions with respect to the dielectric lens, the radiation beam is tilted in the x-axis and y-axis directions.

Next, the construction of an antenna apparatus and a transmission and receiving apparatus according to a second embodiment of the present invention will be described with reference to FIGS. 8 to 14.

Figure 8:
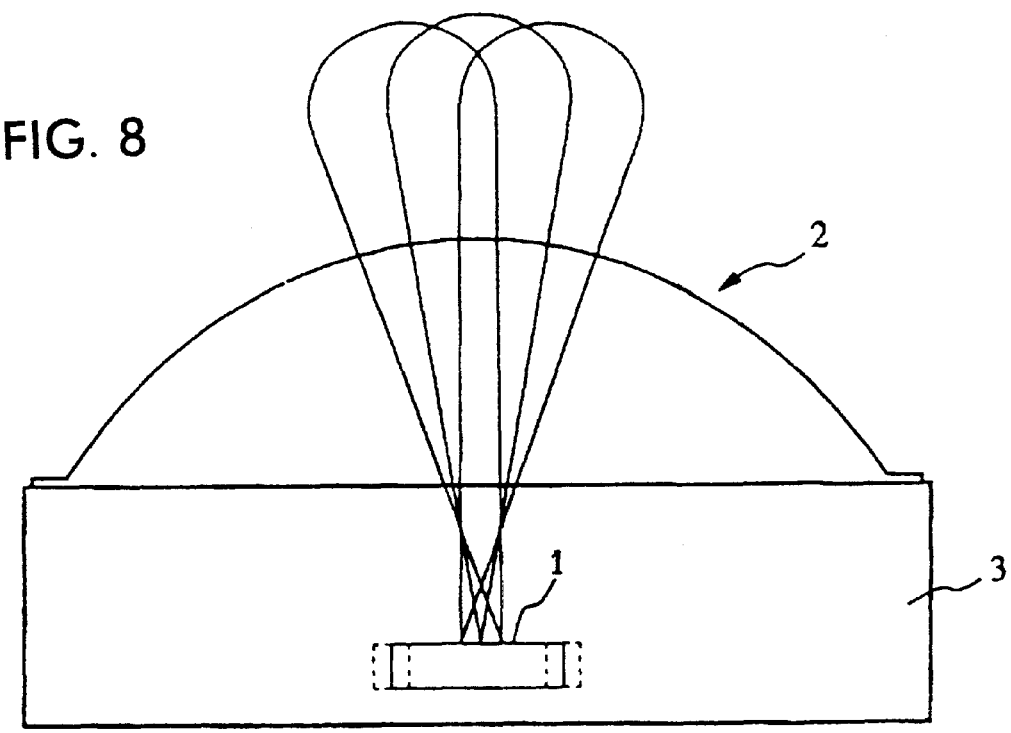
FIG. 8 is a schematic diagram of a transmission and receiving apparatus according to a second embodiment of the present invention.
Figure 9A:
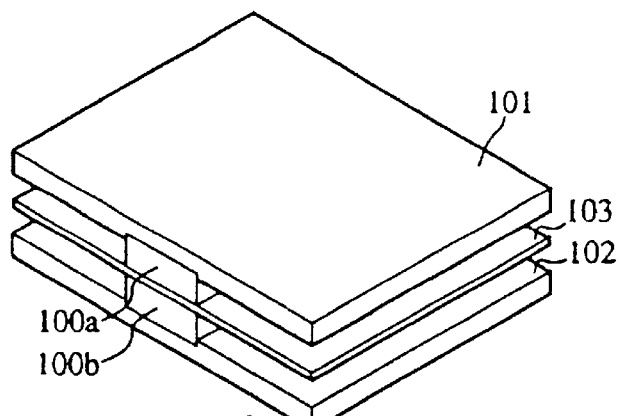
FIGS. 9A, 9B, 9C, and 9D show the construction of a dielectric line for use in the transmission and receiving apparatus.
Figure 9B:
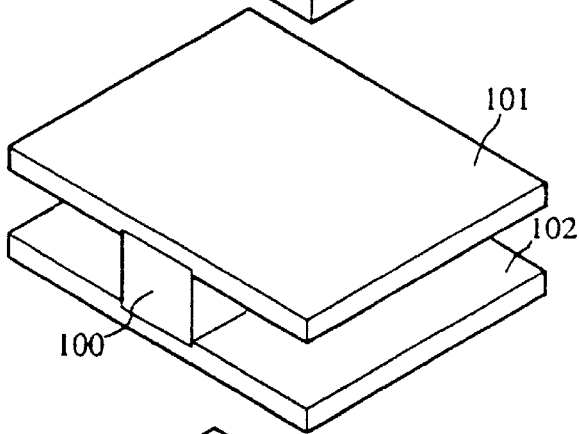
Figure 9C:
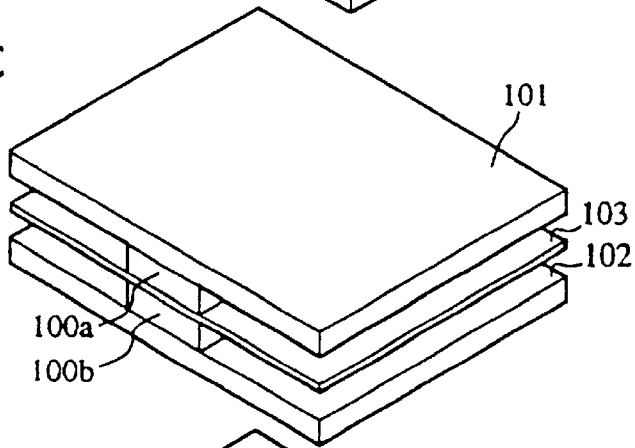
Figure 9D:
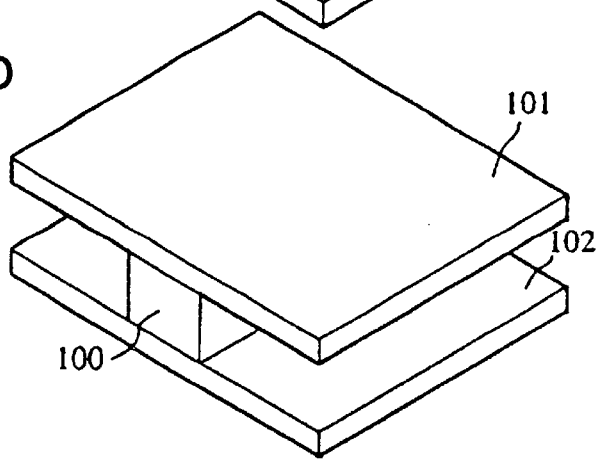

FIG. 8 is a schematic diagram illustrating the construction of the entire transmission and receiving apparatus. In this second embodiment, by displacing the primary radiator 1 in the right-to-left direction in the figure within the housing 3, the radiation beam is tilted in the right-to-left direction in the figure.

FIGS. 9A, 9B, 9C, and 9D are partial perspective views illustrating the construction of a dielectric line for use in the transmission and receiving apparatus according to the second embodiment of the present invention. In FIGS. 9A, 9B, 9C, and 9D, reference numerals 101 and 102 each denote a conductor plate. In the examples shown in FIGS. 9B and 9D, the dielectric line is formed with a dielectric strip 100 being sandwiched between these two conductor plates. In the examples shown in FIGS. 9A and 9C, a substrate 103, together with dielectric strips 100a and 100b, are provided between the conductor plates 101 and 102, and a substrate having a surface parallel to the transmission direction of the dielectric strip is formed at the same time. The difference between FIGS. 9A and 9B and FIGS. 9C and 9D is the presence or absence of the grooves for the dielectric strips in the conductor plates 101 and 102. When grooves are formed as in FIGS. 9A and 9B, the spacing between conductor plates in the propagation area formed of a dielectric strip and a non-propagation area having no dielectric strip and the dielectric constant of the dielectric strip are set, the cut-off frequency of the LSM01 mode is set to be lower than the cut-off frequency of the LSE01 mode, and transmission becomes possible always in a single mode of the LSM01 mode regardless of the radius of curvature or the like of the bend section of the dielectric strip. As a result, a smaller size can be achieved as a whole, and a lower loss can be achieved. The dielectric lines of each construction shown in FIGS. 9A, 9B, 9C, and 9D may be used as required.

Figure 10A:
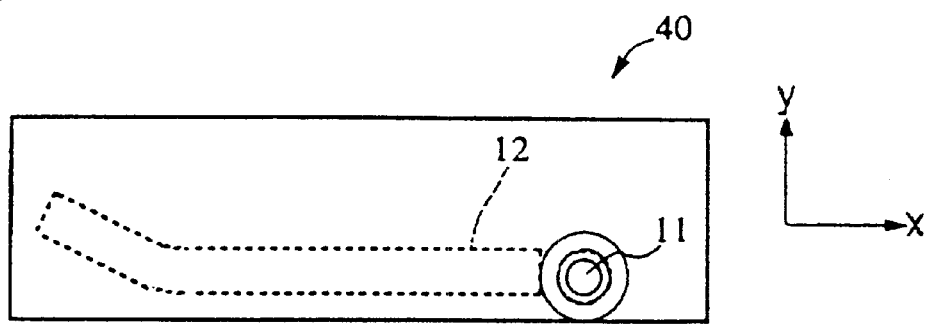
FIGS. 10A and 10B are a plan view and a sectional view, respectively, showing the construction of a primary vertical radiator.
Figure 10B:
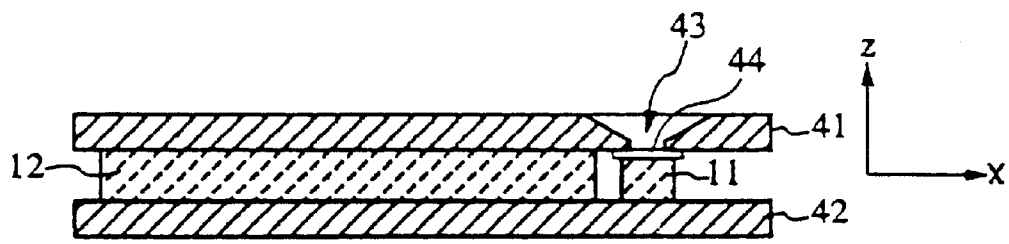

FIGS. 10A and 10B show the construction of a primary vertical radiator. FIG. 10A is a plan view when viewed from the radiation direction, and FIG. 10B is a sectional view of the essential portion thereof. A dielectric strip 12 and a cylindrical dielectric resonator 11 are provided between conductor plates 41 and 42, with a hole 43, which is coaxial with the dielectric resonator 11, being formed in the conductor plate 41. Then, a slit plate 44 having a slit formed in the conductor plate is interposed between the dielectric resonator 11 and the hole 43. As a result, in the LSM mode in which occur an electric field having components at right angles (in the x-axis direction in the figure) to the length of the dielectric strip 12 and parallel (in the y-axis direction in the figure) to the conductor plates 41 and 42 and a magnetic field having components perpendicular (in the z-axis direction in the figure) to the conductor plates 41 and 42, an electromagnetic wave propagates within the dielectric strip 12. Then, the dielectric strip 12 and the dielectric resonator 11 are electromagnetically coupled to each other, and an HE111 mode having electric-field components in the same direction as that of the electric field of the dielectric strip 12 occurs within the dielectric resonator 11. Then, a linearly polarized electromagnetic wave is radiated in a perpendicular direction (in the z-axis direction) via the hole 43 to the conductor plate 41. When, conversely, an electromagnetic wave enters from the hole 43, the dielectric resonator 11 excites in the HE111 mode, and the electromagnetic wave propagates to the dielectric strip 12, which is coupled to the dielectric resonator 11, in the LSM mode.

FIG. 11 shows the relationship between the primary vertical radiator and a dielectric-line apparatus comprising a dielectric line coupled to the primary radiator. The top half of FIG. 11 is a plan view of the coupled section of a primary radiator 40 and a dielectric-line apparatus 50. However, in FIG. 11, a state in which the upper conductor plate is removed is shown. The bottom half of FIG. 11 is a sectional view illustrating the relationship between the primary radiator 40 and the dielectric lens 2. A dielectric strip 13 is provided in the dielectric-line apparatus 50 as shown in the top half of the figure, and the dielectric strip 12 of the primary radiator 40 is brought close to the dielectric strip 13, forming a directional coupler formed of a dielectric line in the portion surrounded by the broken line in the figure. This directional coupler using the dielectric strips 12 and 13 causes an electromagnetic wave propagated from port #1 to propagate to port #4 at approximately 0 dB, that is, a 0-dB directional coupler is formed. Even if the primary vertical radiator 40 moves in the right-to-left direction in the figure in this state, the coupling relationship of the directional coupler does not vary, and the electromagnetic wave propagated from port #1 is output to port #4 always at approximately 0 dB. Conversely, the electromagnetic wave which is made to enter from port #4 because of the excitation of the dielectric resonator is propagated to port #1 at approximately 0 dB. In the state shown in the figure, portions indicated by o and o' of the dielectric strip 12 correspond to a and b portions. When the primary vertical radiator 40 is displaced at a maximum to the right in the figure, the points n and n' coincide with the a and b portions. When, conversely, the primary vertical radiator 40 is displaced at a maximum to the left in the figure, the points p and p' coincide with the a and b portions. Even if the primary vertical radiator 40 is displaced in this manner, since that portion of the dielectric strip 12 which is coupled to the dielectric strip 13 is a straight-line portion, these are maintained always at a fixed amount of coupling.

FIG. 12 is a partial perspective view of a directional coupler formed between the primary vertical radiator and the dielectric-line apparatus. In FIG. 12, reference numerals 51 and 52 each denote a conductor plate. Since these two conductor plates 51 and 52 are close to the conductor plates 41 and 42 on the primary vertical radiator side, the continuity of the planes of the upper and lower conductors in which a dielectric strip is sandwiched is maintained. As a result, the directional coupler operates in nearly the same way as a directional coupler in which two dielectric strips are provided side-by-side between two conductor plates.

FIGS. 13A and 13B show the directional coupler and the relationship of the power distribution ratio thereof, respectively. If the phase constant of the even mode of the coupling line formed of the dielectric strips 12 and 13 is denoted as $\beta e$, the phase constant of the odd mode is denoted as $\beta o$, and $)\beta=*\beta e-\beta o*$ is set, the power ratio of the electromagnetic wave output to port #2 to the electromagnetic wave input from port #1 is expressed as P2/P1=1−sin2( )$\beta z/2$), and the power ratio of the electromagnetic wave output to port #4 to the electromagnetic wave input from port #1 is expressed as P4/P1=sin2( )$\beta z/2$). Therefore, if the relationship of ( )$\beta z/2$)=nB+B/2[n:0,1,2 . . . ] is satisfied, all of the input from port #1 is output to port #4, and thus a 0-dB directional coupler is formed.

Figure 14:
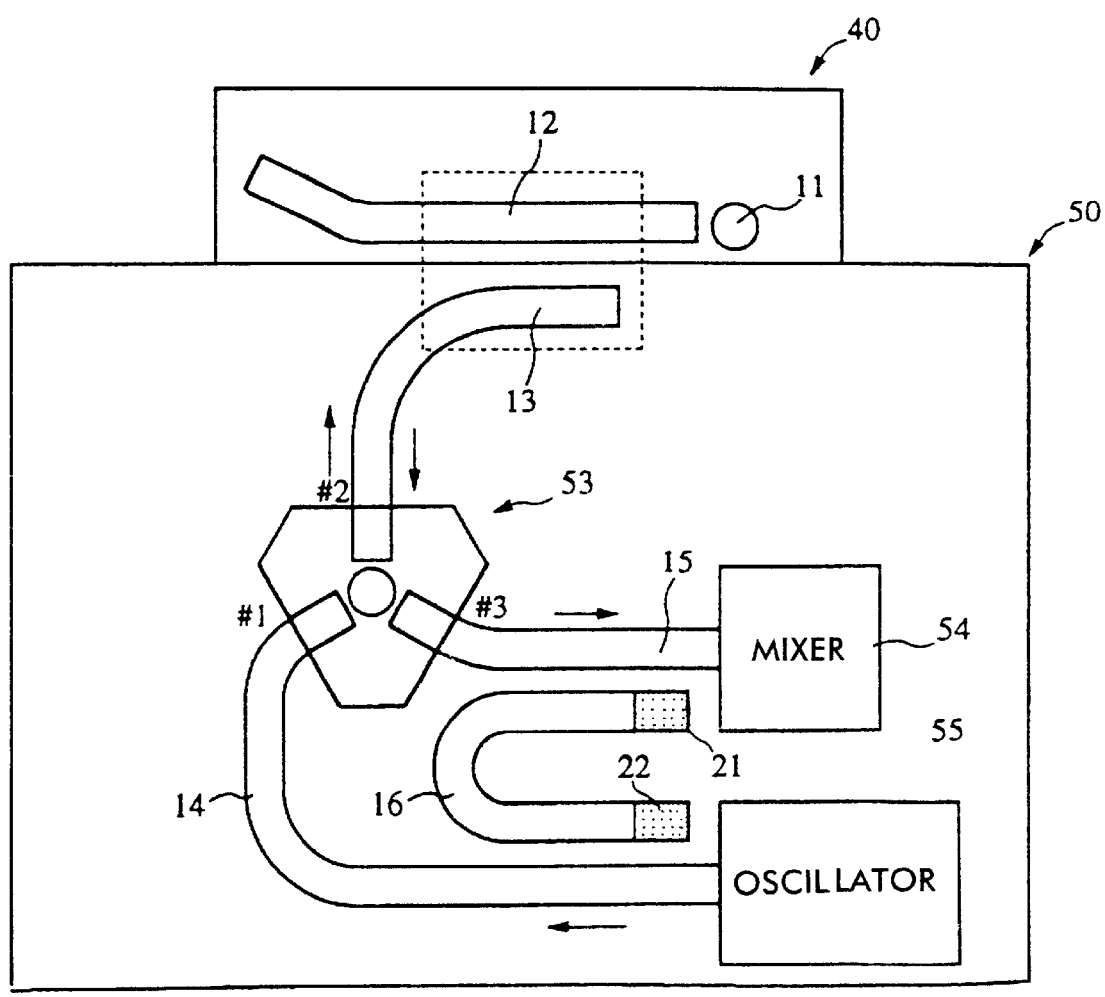
FIG. 14 is a diagram showing the transmission and receiving apparatus according to the second embodiment of the present invention.

FIG. 14 shows the construction of the dielectric-line apparatus, including a transmission and receiving section, and the whole primary vertical radiator, with the upper conductor plate being removed. In FIG. 14, reference numeral 53 denotes a circulator, in which a signal input from port #1 is output to port #2, and a signal input from port #2 is output to port #3. A dielectric line formed by a dielectric strip 14 is connected to port #1, and a dielectric line formed by a dielectric strip 15 is connected to port #3. An oscillator 55 and a mixer 54 are connected to the respective dielectric lines formed by the dielectric strips 14 and 15. Further, a dielectric strip 16 which is coupled to each dielectric line to form each directional coupler is disposed between the dielectric strips 14 and 15. Terminaters 21 and 22 are provided at both end portions of this dielectric strip 16. A varactor diode and a Gun diode are provided in the mixer 54 and the oscillator 55, and a dielectric line having a substrate shown in FIG. 9A or 9C interposed therein is formed to provide a circuit for applying a bias voltage to the varactor diode and the Gun diode.

With such a construction, an oscillation signal of the oscillator 55 is propagated along the path of the dielectric strip 14, the circulator 53, the dielectric strip 13, the dielectric strip 12, and the dielectric resonator 11, and an electromagnetic wave is radiated in the axial direction of the dielectric resonator 11. Conversely, the electromagnetic wave which enters the dielectric resonator 11 is input to the mixer 54 along the path of the dielectric strip 12, the dielectric strip 13, the circulator 53, and the mixer 54. A part of the oscillation signal is provided as a local signal, together with the received signal, to the mixer 54 via the two directional couplers formed of the dielectric strips 15, 16, and 14. As a result, the mixer 54 generates a frequency component of the difference between the transmission signal and the received signal as an intermediate frequency signal.

Figure 15:
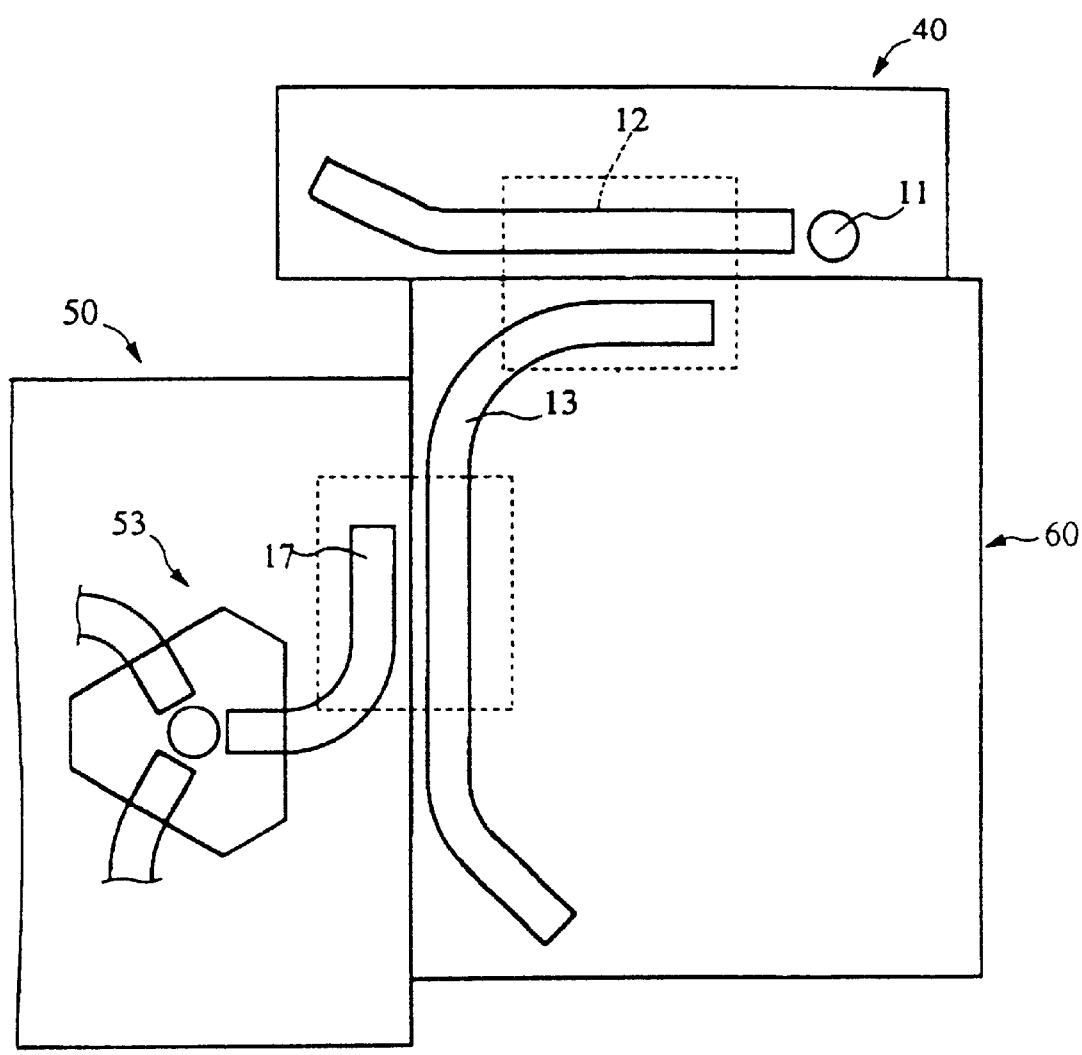
FIG. 15 is a plan view illustrating the construction of a transmission and receiving apparatus according to a third embodiment of the present invention.

Next, the construction of an antenna apparatus and a transmission and receiving apparatus according to a third embodiment of the present invention will be described with reference to FIG. 15. In this third embodiment, a primary vertical radiator can be moved in two dimensions. As shown in the plan view of FIG. 15, a dielectric line formed by the dielectric strip 13 is provided in a dielectric-line apparatus 60, and a dielectric line formed by a dielectric strip 17, a circulator 53, and the like are formed in the dielectric-line apparatus 50. The dielectric strip 12 provided in the primary radiator 40 and the dielectric strip 13 on the side of the dielectric-line apparatus 60 form one 0-dB directional coupler, and the dielectric strips 13 and 17 form another 0-dB directional coupler. The primary radiator 40 is provided in such a manner as to be movable in the right-to-left direction in the figure with respect to the dielectric-line apparatus 60, and the dielectric-line apparatus 60 is provided in such a manner as to be movable in the vertical direction in the figure with respect to the dielectric-line apparatus 50. In this case, the dielectric-line apparatus 50 is fixed. This makes it possible to move the position of the dielectric resonator 11 in a two-dimensional direction in a state in which there is hardly any loss in the coupler.

Figure 16A:
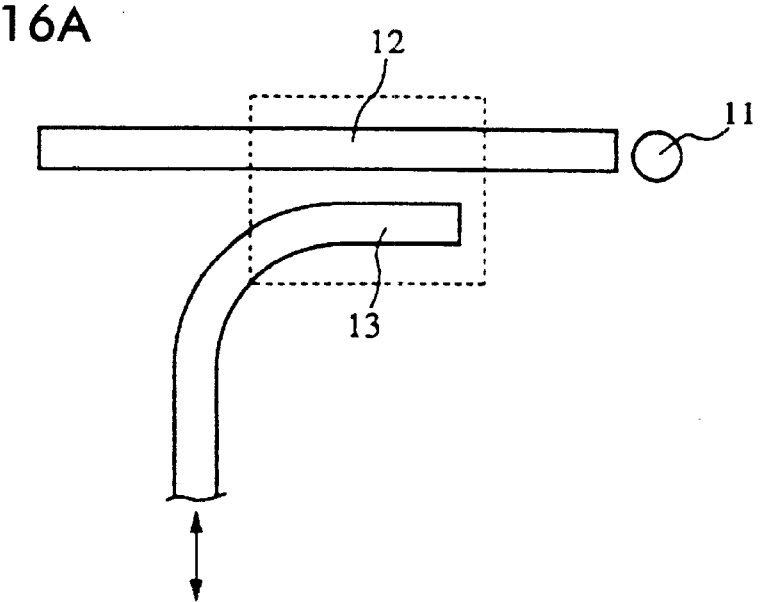
FIGS. 16A, 16B, and 16C show three examples of a directional coupler in a movable section of an antenna apparatus according to a fourth embodiment of the present invention.
Figure 16B:
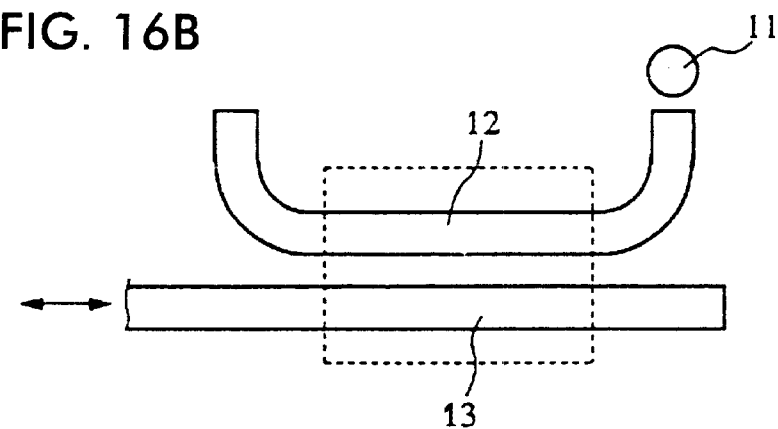
Figure 16C:
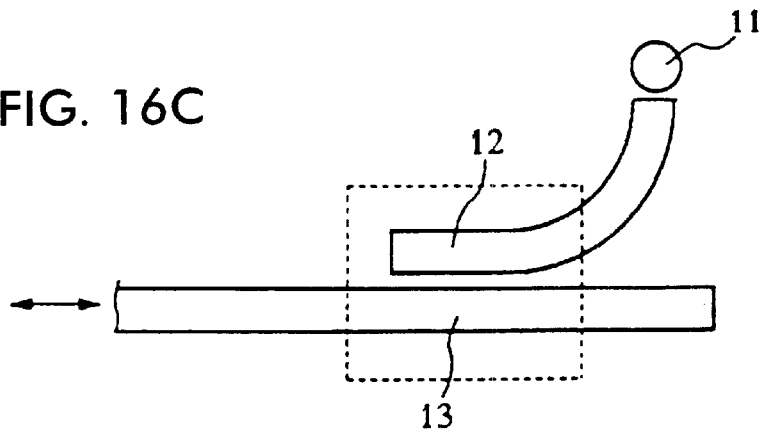

FIGS. 16A, 16B, and 16C are plan views showing other examples of a directional coupler in the movable section of an antenna apparatus according to a fourth embodiment of the present invention, with an illustration of the upper and lower conductor plates being omitted. In the example of FIG. 16A, the dielectric strip 12 on the side which couples to the dielectric resonator 11 is formed as a straight line. In the example of FIG. 16B, the dielectric strip 13 on the side which couples to the dielectric resonator 12 is formed as a straight line. In the example of FIG. 16C, one end of the dielectric strip 12 which is coupled at its other end to the dielectric resonator 11 is kept at a fixed distance to and in parallel to the mating dielectric strip 13 up to the end portion.

Figure 17:
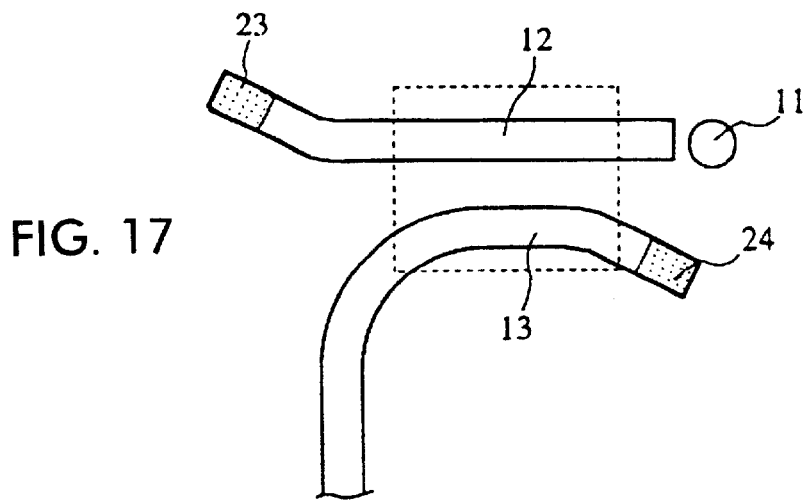
FIG. 17 shows an example of the directional coupler in the movable section of an antenna apparatus according to a fifth embodiment of the present invention.

FIG. 17 shows an example of the construction of a directional coupler in the movable section of an antenna apparatus according to a fifth embodiment of the present invention. Although in the above-described examples a 0-dB directional coupler is formed as a directional coupler in the movable section, as shown in FIG. 17, terminaters 23 and 24 may be provided in one end of the dielectric strips 12 and 13, respectively, without forming one end portion of the dielectric strips 12 and 13 as an open end.

Although the above-described embodiments describe a primary vertical radiator using a dielectric resonator and a dielectric line, or a horn antenna as examples of the primary radiator, in addition to these, a microstrip antenna, such as a patch antenna, may be used.

Many different embodiments of the present invention may be constructed without departing from the spirit and scope of the present invention. It should be understood that the present invention is not limited to the specific embodiments described in this specification. To the contrary, the present invention is intended to cover various modifications and equivalent arrangements included within the spirit and scope of the invention as hereafter claimed. The scope of the following claims is to be accorded the broadest interpretation so as to encompass all such modifications, equivalent structures, and functions.

What is claimed is:

1. An antenna apparatus comprising:

a dielectric lens having a focal plane, the focal plane of the dielectric lens being outside the dielectric lens; and a primary radiator, the dielectric lens and primary radiator having a relative positional relationship, wherein the dielectric lens and the primary radiator are arranged so that the relative positional relationship of the primary radiator within the focal plane of the dielectric lens is changeable; and further wherein said primary radiator comprises a first dielectric line serving as an input/output section, a dielectric resonator coupled to the first dielectric line, and an opening section from which an electromagnetic wave is at least one of radiated and received in an axial direction, a second dielectric line being provided adjacent said first dielectric line to form a directional coupler having an amount of coupling, the relative positional relationship between said dielectric lens and said primary radiator being changed by varying the amount of coupling in a coupled section of the first and second dielectric lines.

2. The antenna apparatus according to claim 1, wherein the amount of coupling of said directional coupler is approximately 0 dB.

3. The antenna apparatus according to claim 2, wherein a transmission section, a receiving section and a circulator for separating a transmission signal and a received signal are connected to said second dielectric line so that the antenna apparatus is used for both transmission and reception.

4. The antenna apparatus according to claim 1, wherein a transmission section, a receiving section and a circulator for separating a transmission signal and a received signal are connected to said second dielectric line so that the antenna apparatus is used for both transmission and reception.

5. The antenna apparatus according to claim 1, further comprising a third dielectric line provided adjacent said second dielectric line to form a second directional coupler having an amount of coupling, the relative positional relationship between the dielectric lens and the primary radiator being further changed by varying the amount of coupling of said second directional coupler in a coupled section of the second and third dielectric lines, whereby the relative positional relationship between the dielectric lens and the primary radiator can be changed in two dimensions.

* * * * *